United States Patent [19]
Carlson et al.

[11] Patent Number: 6,097,563
[45] Date of Patent: Aug. 1, 2000

[54] HEAD SWITCH OPERATIONS IN A MAGNETIC DISK SYSTEM

[75] Inventors: Lance Robert Carlson, Niwot; Aaron Wade Wilson, Berthoud, both of Colo.

[73] Assignee: STMicroelectronics N.V., Netherlands

[21] Appl. No.: 08/994,185

[22] Filed: Dec. 19, 1997

[51] Int. Cl.$^7$ ............................. G11B 15/12; G11B 5/596
[52] U.S. Cl. ........................................... 360/63; 360/78.04
[58] Field of Search ............................. 360/48, 63, 78.04

[56] References Cited

U.S. PATENT DOCUMENTS 5,475,544  12/1995  Takeuchi .............................. 360/78.04

*Primary Examiner*—W. Chris Kim
*Attorney, Agent, or Firm*—Theodore E. Galanthay; Lisa K. Jorgenson

[57] ABSTRACT

A method and apparatus for performing head switch operations in a magnetic disk system with a magnetic disk device that is segmented into a plurality of cylinders. The cylinders are grouped into an inner zone, a middle zone, and an outer zone. The inner zone is near the innermost area of the magnetic disk device. The outer zone is near the outermost area of the magnetic disk device. The middle zone is in between the inner zone and the outer zone. The head switch is performed from a current head at a current cylinder to a target head at a target cylinder. Prior to the head switch, the system determines if the current cylinder is in either the inner zone or the outer zone. If the current cylinder is in either the inner zone or the outer zone, then the system determines if the target cylinder is in either the inner zone or the outer zone. If the target cylinder is in either the inner zone or the outer zone, then the system seeks the current head to the middle zone and then performs the head switch. If the target cylinder is in the middle zone, then the system seeks the current head to the target cylinder and then performs the head switch. If the current cylinder is in the middle zone, then the system performs the head switch without seeking. After the head switch, the system seeks the target head to the target cylinder.

10 Claims, 8 Drawing Sheets

HEAD SWITCH OPERATIONS IN A MAGNETIC DISK SYSTEM

FIELD OF THE INVENTION

The invention is related to the field of magnetic disk systems, and in particular, to a system that prevents a loss of servo data after a head switch due to head position misalignment.

PROBLEM

Magnetic disk systems store data on a magnetic disk device. The magnetic disk device is typically comprised of multiple disk surfaces arranged in parallel. The magnetic disks are attached to a perpendicular spindle that forms a central axis running through the center of each magnetic disk. Each disk surface contains numerous concentric data tracks that are located at varying distances around the central axis. The magnetic disk device is also segmented into cylinders. Each cylinder represents a group of data tracks that are aligned with one another on different disk surfaces at the same distance from the central axis.

Magnetic disk systems use read/write heads to read or write data to the magnetic disk device. The read/write heads are connected to an actuator arm that positions each read/write head just above its associated disk surface. Ideally, the read/write heads are aligned so that all read/write heads are positioned above the same cylinder at the same time. In a head switch operation, the magnetic disk system switches from the head currently in use to a target head. If the heads are properly aligned, then the target head is still positioned over the same cylinder after the head switch.

The surfaces of a magnetic disk device have servo data fields that extend in a radial direction away from the central axis. When the magnetic disk device spins, the read/write heads encounter the servo data fields within a cylinder at regular intervals. The servo data fields house critical timing and positioning data that must be read by the read/write heads for system control and positioning. Loss of the servo data leads to catastrophic failure of the servo system that requires recovery procedures.

Unfortunately, events occur that cause the read/write heads to become mis-aligned. Some examples of these events are physical shock, warping, and temperature fluctuation. Removable disks pose a special problem because the heads that write the servo data are in different equipment than the heads involved with the head switch. Head misalignment between heads in different pieces of equipment is typically larger and more prevalent. Head mis-alignment can cause a catastrophic loss of servo data after a head switch operation because the current head may be positioned over servo data, but the misaligned target head may not be positioned over servo data. The loss of servo data prevents normal operation of the servo system because the system does not know the position of the heads relative to the disk. The system cannot retrieve any data until recovery procedures have been performed.

The prior solution to this problem is to use recovery procedures if servo data is lost after a head switch. The recovery procedures take time and produce undesirable side effects, such as audible noise. To minimize the need for recovery procedures, the prior solution does not use the inner and outer cylinders of the magnetic disk device to store user data. The inner and outer cylinders are only used to provide servo data. The user data is restricted to a group of middle cylinders in between the groups of inner and outer cylinders. This restriction keeps the head currently in use over the middle cylinders, and moderate head misalignment only causes the target head to be positioned over an inner or outer cylinder. After a head switch, the target head can then read the servo data from the inner or outer cylinder and seek back to the middle cylinder where the user data is stored.

This solution is lacking because valuable memory space in the inner and outer cylinders is wasted. The wasted space is even greater in removable disk systems where head misalignment is typically larger and more prevalent. In addition, the selection of the boundaries between the middle cylinders and the inner/outer cylinders is a complex and time-consuming process that drives up the cost of the magnetic disk system. Since the typical magnetic disk system is comprised of numerous components from multiple vendors, various configurations must be tested to determine the boundaries. There is a need for a head switch system that allows the inner and outer cylinders to be utilized for user data storage. Such a system should simplify the design process and minimize the loss of servo data after a head switch.

SOLUTION

The invention overcomes the above problems by providing a head switch system that minimizes the loss of servo data after a head switch, and that allows the inner and outer cylinders to be utilized for user data storage. Before a head switch, the system determines if the current cylinder is near the innermost or outermost areas of the magnetic disk device. If so, the system seeks the current head to a cylinder nearer the mid-point between the innermost and outermost areas of the disk device before making the head switch. After the head switch, the system seeks the target head to the target cylinder.

By seeking the current head to a middle cylinder before the head switch, the system significantly increases the likelihood that the target head will be positioned over servo data after the head switch. The system can then safely seek to a target cylinder in the innermost or outermost areas of the magnetic disk device. In a distinct advance in the art, the invention allows the cylinders in the innermost and outermost areas of the magnetic disk device to be utilized for user data storage. The invention also simplifies the selection of the boundaries between the middle cylinders and the inner/outer cylinders. A conservative selection can quickly be made because no user memory is lost by the selection. The simplicity of design lowers the time and complexity associated with product development, and lowers the cost of the resulting product.

The invention is a method for performing head switch operations and an apparatus for performing the method. The invention is for use in a magnetic disk system with a magnetic disk device that is segmented into a plurality of cylinders. The cylinders are grouped into an inner zone, a middle zone, and an outer zone. The inner zone is near the innermost area of the magnetic disk device. The outer zone is near the outermost area of the magnetic disk device. The middle zone is in between the inner zone and the outer zone.

The head switch is performed from a current head at a current cylinder to a target head at a target cylinder. Before the head switch, the system determines if the current cylinder is in either the inner zone or the outer zone. If the current cylinder is in either the inner zone or the outer zone, then the system determines if the target cylinder is in either the inner zone or the outer zone. If the target cylinder is in either the inner zone or the outer zone, then the system seeks the current head to the middle zone and then performs the head switch. If the target cylinder is in the middle zone, then the system seeks the current head to the target cylinder and performs the head switch. If the current cylinder is in the middle zone, then the system performs the head switch without seeking. After the head switch, the system seeks the target head to the target cylinder.

DETAILED DESCRIPTION

Figure 1:
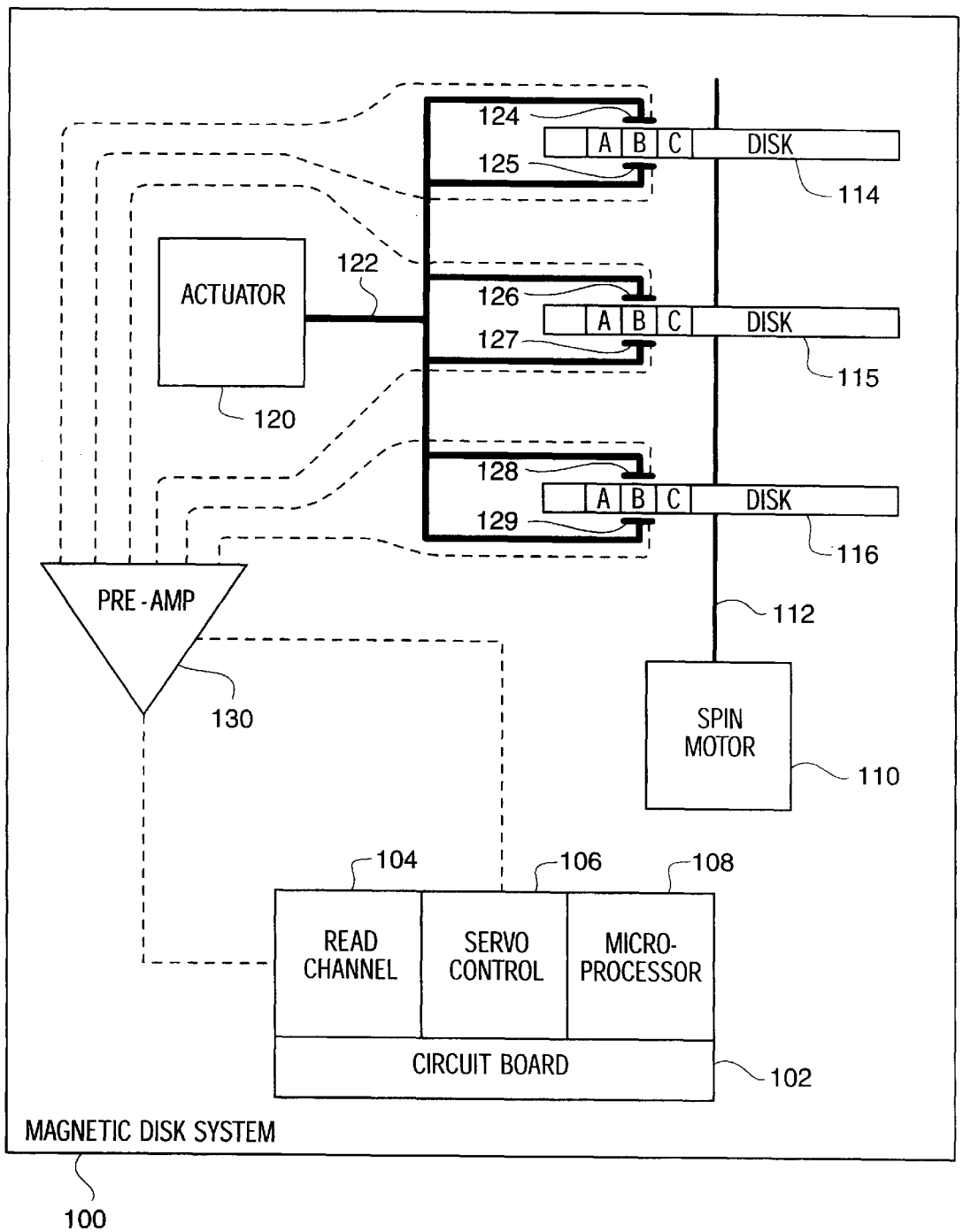
FIG. 1 is a block diagram of a magnetic disk system in an embodiment of the invention.

Magnetic Disk Storage System Architecture—FIG. 1

FIG. 1 is a block diagram of a magnetic disk system 100. The magnetic disk system 100 is comprised of a circuit board 102 that includes a read channel 104, a servo control 106, and a microprocessor 108. The read channel 104, servo control 106, and microprocessor 108 are typically integrated circuits on the circuit board 102. The read channel is operationally coupled to the servo control 106, and the servo control 106 is operationally coupled to the microprocessor 108. The magnetic disk system 100 is further comprised of a spin motor 110 with an attached spindle 112 that is connected to magnetic disks 114, 115, and 116. The magnetic disk system 100 is also comprised of an actuator 120 with an attached arm 122 that is connected to read/write heads 124, 125, 126, 127, 128, and 129. The read/write heads 124–129 are each operationally coupled to a pre-amp 130. The pre-amp 130 is operationally coupled to the read channel 104 and the servo control 106. Although not shown for clarity, the servo control 106 is operationally coupled to the actuator 120 and to the spin motor 110. Aside from the modifications described below, the components and operation of the magnetic disk system 100 are well known in the art. Those skilled in the art appreciate that the magnetic disk system 100 includes numerous other conventional components that are not shown on FIG. 1 for the sake of clarity. In addition, those skilled in the art appreciate that there are other configurations for a magnetic disk system, and that the invention is not restricted to the particular configuration of FIG. 1.

The spin motor 110 rotates the spindle 112 to spin the disks 114–116. The disks 114–116 are arranged in parallel. The spindle 112 passes through the center of the disks 114–116 in a perpendicular direction to form a central axis for the disks 114–116. Each side of a disk provides a surface to store data. The data is stored in concentric data tracks that are located at varying distances around the central axis. The tracks are organized into cylinders. Cylinders A, B, and C are shown on FIG. 1 for the disks 114–116. Each cylinder represents a group of tracks that are aligned with one another on different disk surfaces at the same distance from the central axis.

The heads 124–129 read or write data to the data tracks in the cylinders of the disks 114–116. The actuator 120 uses the arm 122 to position the heads 124–129 over a desired cylinder. On FIG. 1, the heads are positioned over cylinder B. The actuator 120 re-positions the heads 124–129 over cylinder A by retracting the arm 122. The operation of moving the heads 124–129 from one cylinder to another is referred to as a "seek."

The heads 124–126 each generate a read signal that contains data read from the disks 114–116. The heads 124–129 each transmit their respective read signals to the pre-amp 130 over wiring that is depicted on FIG. 1 by dashed 30 lines. The pre-amp 130 is connected to the read channel 104 and the servo control 106 by wiring that is depicted as dashed lines. The pre-amp 130 provides a gating function that passes a read signal from only one of the heads 124–129 to the read channel 104. The servo control 106 provides a control signal to the pre-amp 130 that selects the read signal that is passed by the pre-amp amp 130 and received by the read channel 104. The servo control 106 also provides control signals to the actuator 110 and the spin motor 110.

The read channel 104 receives the read signal that was selected by the servo control 106. The read channel 104 amplifies and demodulates the read signal. The read channel 104 also converts the read signal, or portions of the read signal, from analog to digital. The read channel 104 provides the demodulated servo data to the servo control 106 for processing and distribution. The servo data includes critical timing and position information that is required by the servo control 106 to position the heads 124–129 relative to the disks 114–116 116. Without the servo data, the servo control 106 cannot position the heads 124–129 over selected points on the disks 114–116. The loss of servo data leads to catastrophic system failure.

In operation, the microprocessor 108 requests the servo control 106 to read or write data. The request specifies the head and cylinder. In response, the servo control 106 positions the specified head over the specified cylinder. Positioning may involve seeking the current head from the current cylinder to the specified target cylinder, such as seeking the head 124 from cylinder B to cylinder A. In this case, the servo control 106 causes the actuator 120 to begin moving the head 124 from cylinder B toward cylinder A. The servo control uses the servo data from the read signal to detect when the head 124 is properly positioned over cylinder A. Positioning may also involve a head switch operation from the current head to the specified target head. For example, the servo control may switch from the current head 124 to the target head 127. In this example, the servo control 106 causes the pre-amp 130 to switch and pass the read signal from the head 127 instead of from the head 124. After the head switch, the servo control 106 uses the read signal from the head 127 to obtain the servo information.

Figure 2:
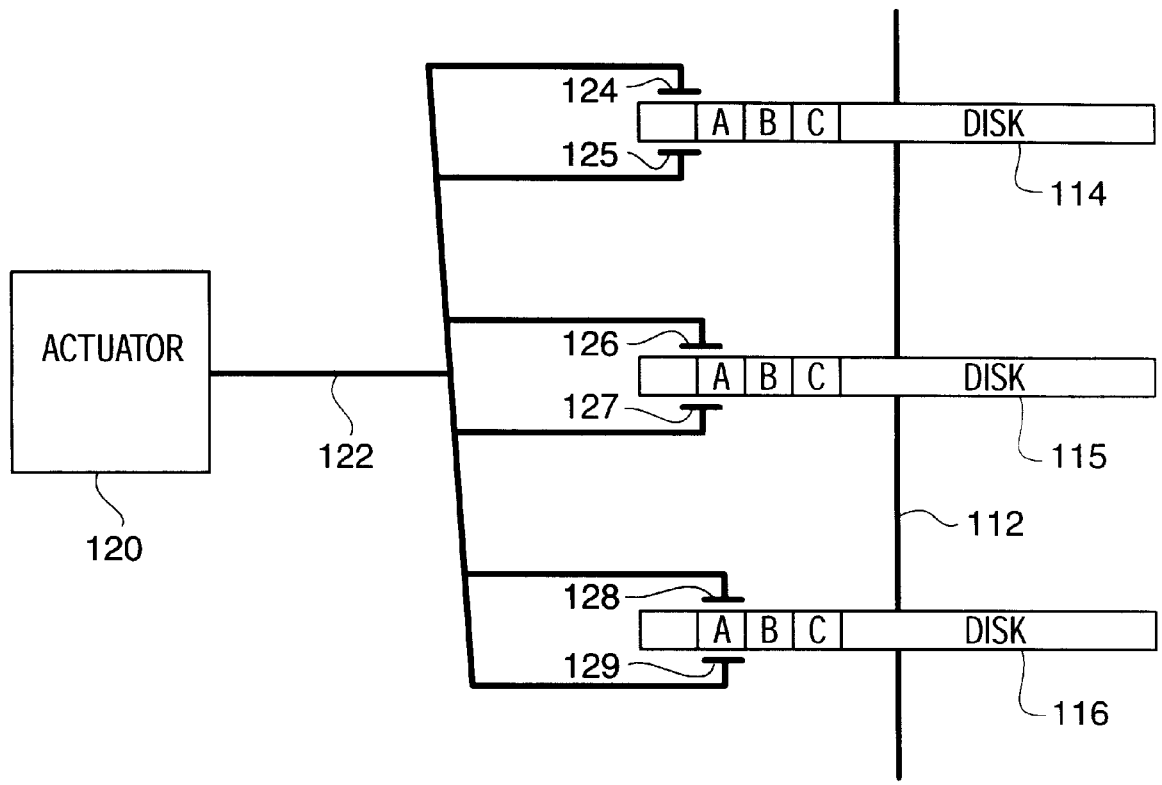
FIG. 2 is a diagram illustrating head mis-alignment in a prior system.
Figure 3:
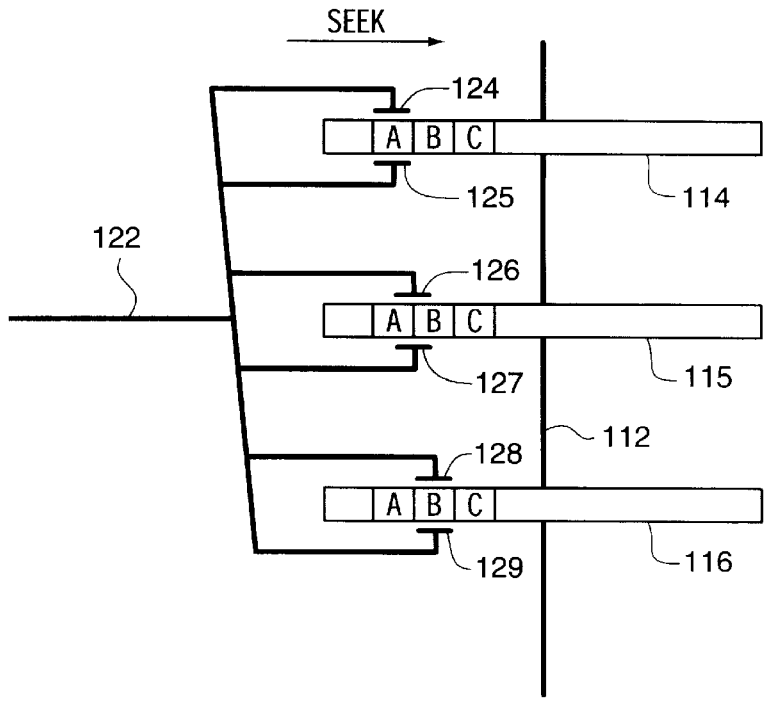
FIG. 3 is a diagram illustrating a prior solution to head mis-alignment.
Figure 4:
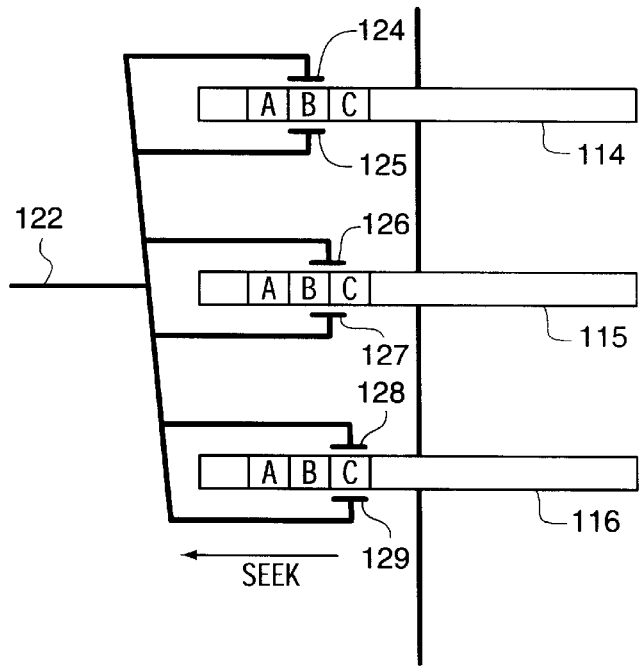
FIG. 4 is a diagram illustrating a prior solution to head mis-alignment.

Head Mis-alignment—FIGS. 2–4

FIG. 2 illustrates head mis-alignment and depicts a portion of the magnetic disk system of FIG. 1. In FIG. 2, the arm 122 is bent. The bent arm 122 positions the head 129 over cylinder A, but positions the head 124 outside of the cylinders that contain servo data. On a head switch from the head 129 to the head 124, a catastrophic failure would occur because the head 124 is not positioned over any servo data. Without servo data, the position of the heads 124–126 relative to the disks 114–116 is lost. Head mis-alignment is caused by many factors. Physical shock and temperature change can wrap or bend the arm 122. In removable disk drives, servo data installation heads write the servo data to the disks, but heads in a different device subsequently read or write data to the disks. Head mis-alignment between the heads of different devices is typically larger and more prevalent.

A prior solution to the problem of head mis-alignment is to restrict the cylinders that store user data. On FIG. 2, only cylinder B would be used to store both user data and servo data. Cylinders A and C would only store servo data. If the current head is always positioned over cylinder B, then the other heads are always positioned somewhere over cylinders A, B, or C given the head misalignment. After a head switch, the target head is positioned somewhere over cylinders A, B, or C and has access to servo data. FIG. 2 depicts head misalignment toward the outermost area of the disk, but the problem is similar for mis-alignment toward the innermost area of the disk.

FIGS. 3–4 depict examples of this prior system. On FIG. 3, if the head switch is from the current head 129 to the target head 124, then the current head 129 is over user data in cylinder B, and the target head 124 is over cylinder A. After the head switch, the target head 124 uses the servo data in cylinder A to seek back to the user data in cylinder B. On FIG. 4, if the switch is from current head 124 to target head 129, then the current head 124 is over user data in cylinder B, and the target head 129 is over cylinder C. After the head switch, the target head 129 uses the servo data in cylinder C to seek back to the user data in cylinder B. This solution is clearly lacking because cylinders A and C are not used to store user data.

The typical magnetic disk system might contain many thousands of cylinders that each have a width of 0.0001 inches. The prior solution also requires complex measurement and calculation to determine the boundaries between the inner/outer cylinders that do not store user data and the middle cylinders that store user data.

Figure 5:
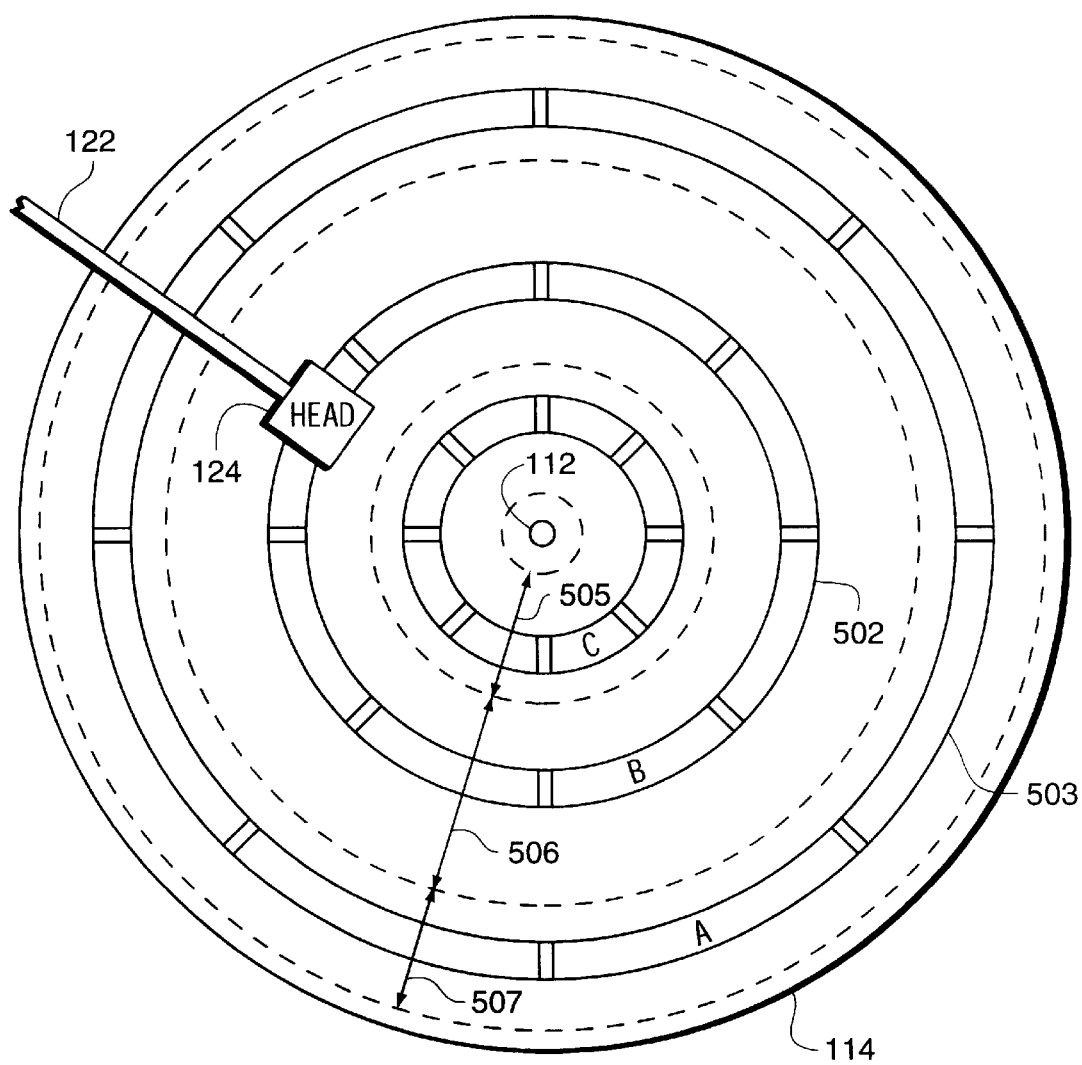
FIG. 5 is a block diagram illustrating the top of a magnetic disk in an embodiment of the invention.
Figure 6:
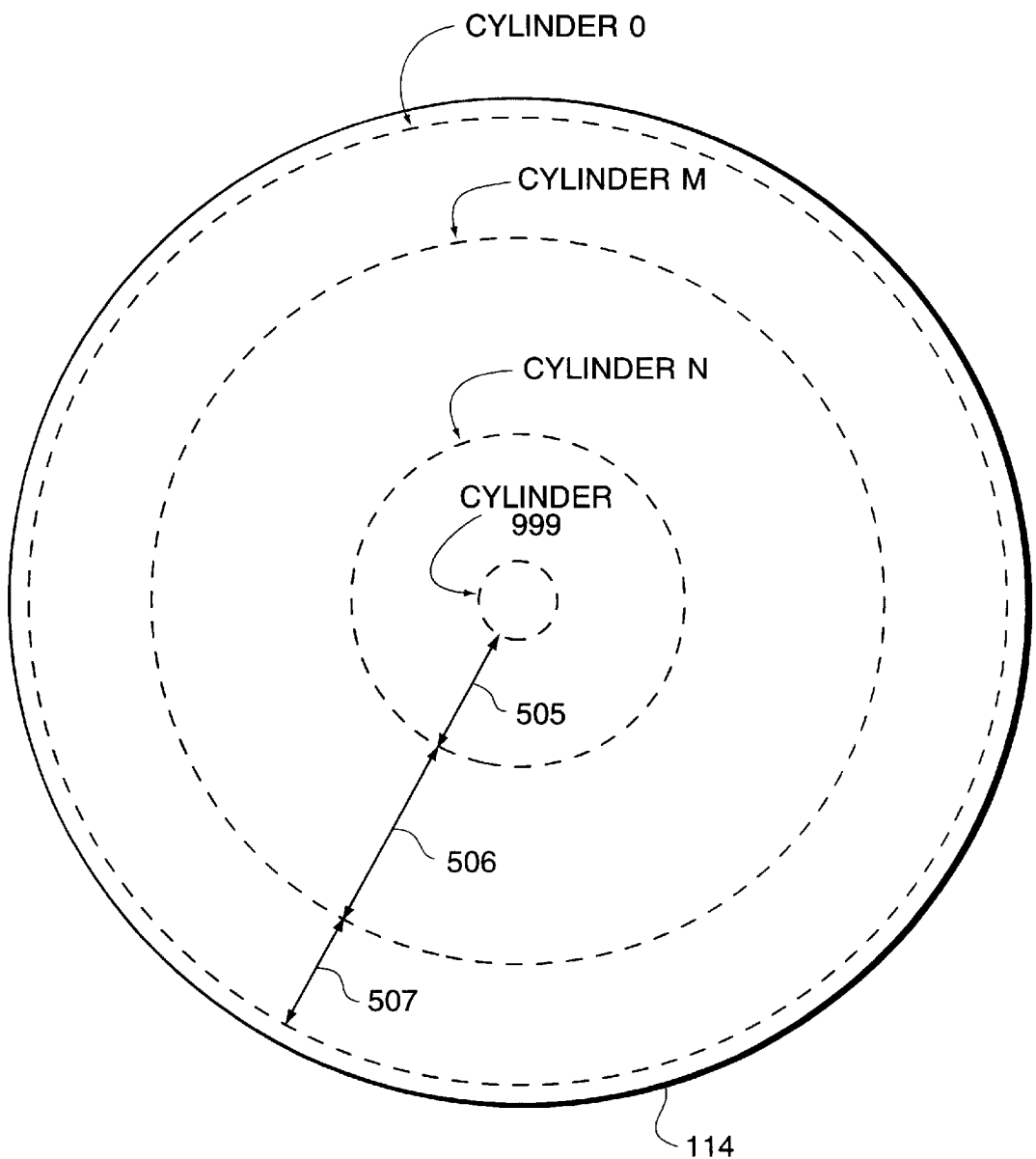
FIG. 6 is a block diagram illustrating the top of a magnetic disk in an embodiment of the invention.

Magnetic Disk Cylinders and Zones—FIGS. 5–6

FIG. 5 depicts the top view of the disk 114, the arm 122, and the head 124 in an example of the present invention. The top surface of the disk 114 includes data track 502, and 503. The data track 501 is in cylinder C. The data track 502 is in cylinder B. The data track 503 is in cylinder A. The smaller banded areas within the data tracks 501–503 represent servo data fields. It can be seen that the servo data fields radiate out from the spindle 112 so that the head 124 encounters the servo data tracks at regular intervals when the disk 114 spins. The head 124 reads the servo data so the system knows the position of the head 124 relative to the disk 114. Those skilled in the art recognize that FIG. 5 is simplified and that a disk typically contains many more data tracks, cylinders, and servo data fields.

The surface of the disk 114 is allocated into three zones—an inner zone 505, a middle zone 506, and an outer zone 507. The zones 505–507 comprise boundaries between groups of cylinders. Typically, there are hundreds of additional cylinders in each zone, but the number shown has been restricted for clarity. Cylinder A is in the outer zone. Cylinder B is in the middle zone. Cylinder C is in the inner zone. The middle zone 506 corresponds to the middle cylinders that were used to store user data in prior systems. The inner zone 505 and the outer zone 506 correspond to the cylinders that were not used to store user data in prior systems.

FIG. 6 depicts the top view of the disk 114, but shows only the inner zone 505, the middle zone 506, and the outer zone 507. The disk 114 has 1000 cylinders. Cylinder 0 forms the outer boundary of the outer zone 507. Cylinder 999 forms the inner boundary of the inner zone 505. Cylinder M forms the boundary between the outer zone and the middle zone. Cylinder N forms the boundary between the inner zone and the middle zone.

In prior systems, cylinder M and cylinder N were selected after considering the following factors: the flyable area of the disk, the textured area of the disk, the mechanical design of the system, the location of the read/write gap on the head, component tolerances, manufacturing tolerances, and temperature tolerances. Those skilled in the art are familiar with these boundary selection procedures. The present invention greatly simplifies the selection of the M and N boundaries, and strict compliance with the boundaries used in prior systems is not required. The number of system configurations and component variations under test can be reduced. In addition, selections that are more conservative can be made since no user memory is lost by the selection.

Figure 7:
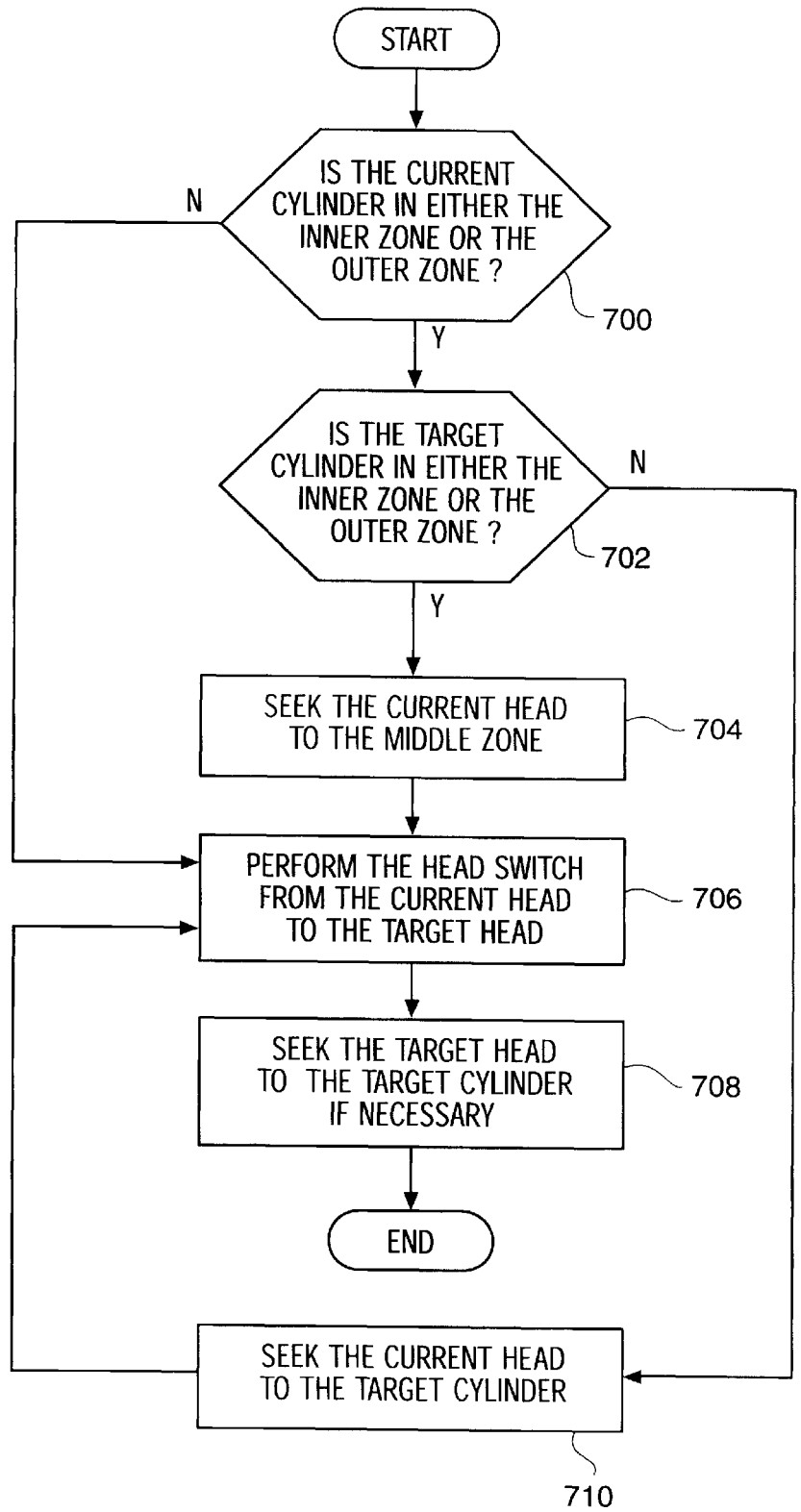
FIG. 7 is a flow diagram depicting system logic for an embodiment of the invention.
Figure 8:
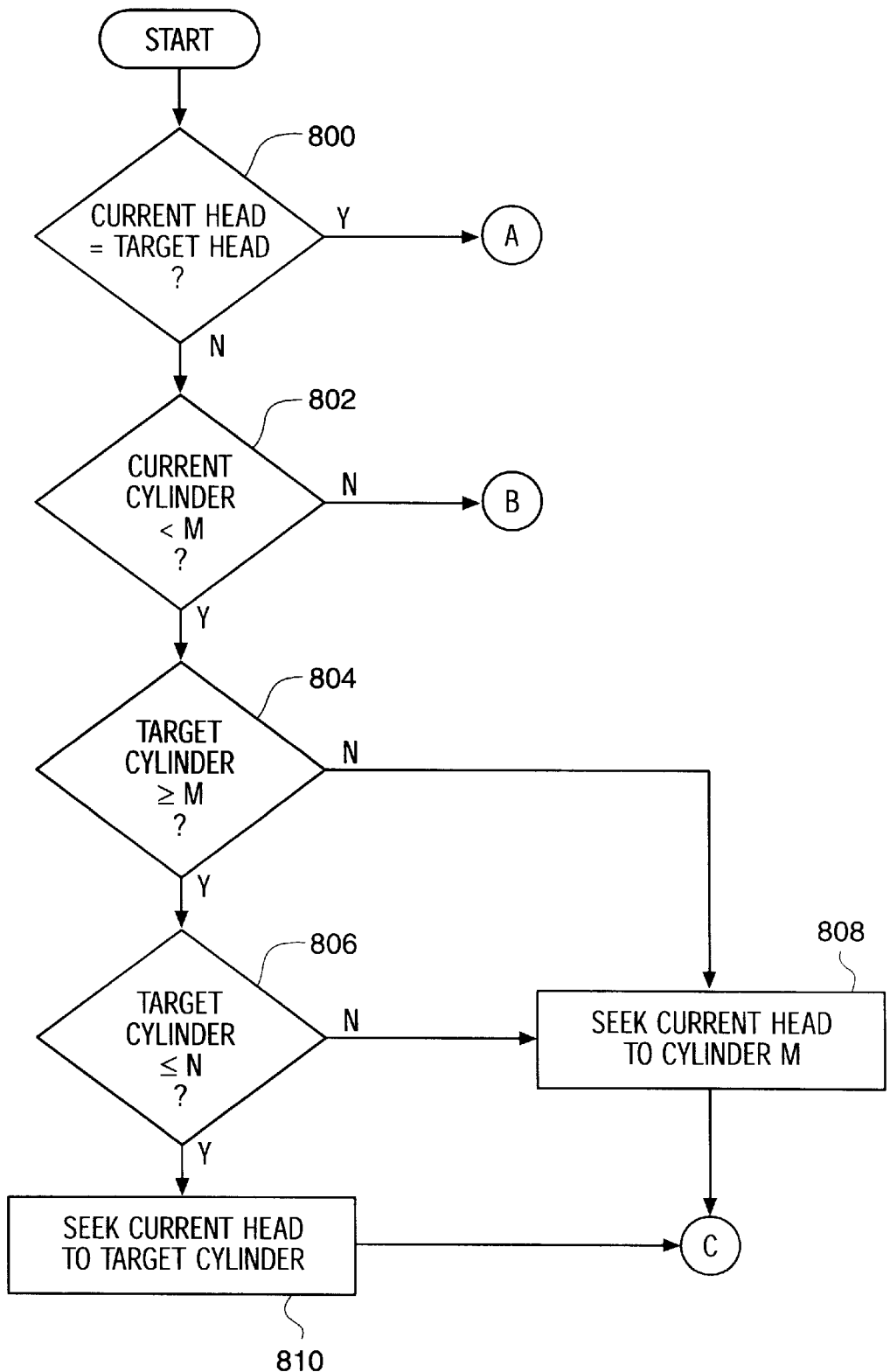
FIG. 8 is a flow diagram depicting system logic for an embodiment of the invention.
Figure 9:
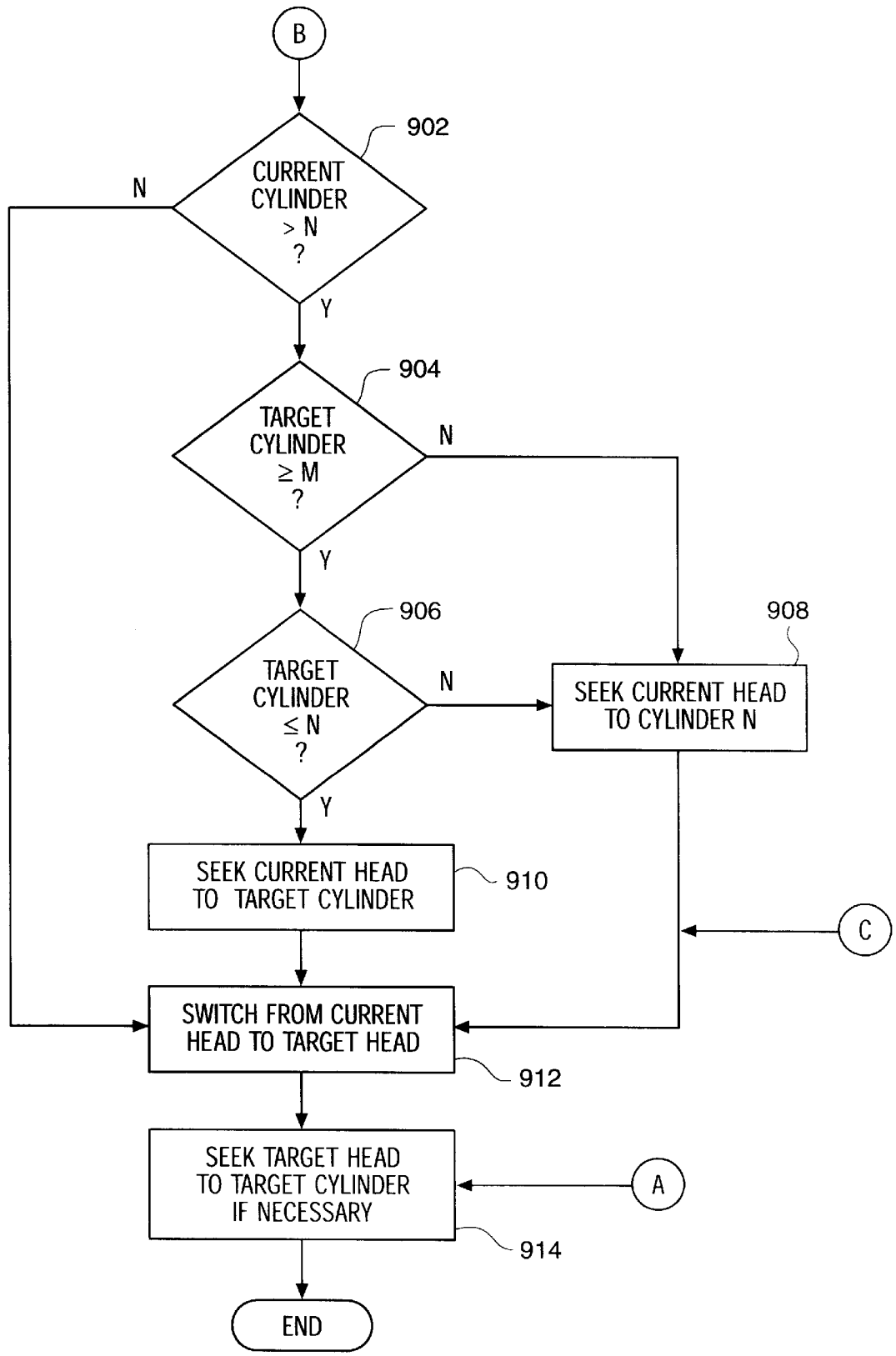
FIG. 9 is a flow diagram depicting system logic for an embodiment of the invention.

System Logic—FIGS. 7–9

FIG. 7 depicts a flow chart of the logic used to perform a head switch operation from a current head at a current cylinder to a target head at a target cylinder. The logic depicted in FIG. 7 refers to the cylinders and zones depicted on FIGS. 5–6. The logic can be aggregated into two components. A first logic component determines the location of the current cylinder and the target cylinder in relation to the inner, middle, and outer zones. The second signaling component signals the magnetic disk device to seek and switch heads in response to the determinations made by the first component.

After the need for a head switch is determined, the logic determines if the current cylinder is in either the inner zone or the outer zone in step 700. If the current cylinder is in either the inner zone or the outer zone in step 700, then the logic determines if the target cylinder is in either the inner zone or the outer zone in step 702. If the target cylinder is in either the inner zone or the outer zone in step 702, then the logic signals the system to seek the current head to the middle zone in step 704 and to perform the head switch from the current head to the target head in step 706. If the logic determines that the current cylinder is not in either the inner zone or the outer zone in step 700, then the logic signals the system to perform the head switch from the current head to the target head in step 706. If the logic determines that the target cylinder is not in either the inner zone or the outer zone in step 702, then the logic signals the system to seek the current head to the target cylinder in step 710, and then to perform the head switch from the current head to the target head in step 706. If necessary, the logic signals the system to seek the target head to the target cylinder in step 708.

FIGS. 8–9 depicts a flow chart of the logic used to perform a head switch operation in some embodiments of the present invention. The logic in FIGS. 8–9 refers to the M and N cylinders depicted in FIG. 6. The logic determines if the current head equals the target head in step 800. If the current head is equal the target head in step 800, then the logic proceeds to A on FIG. 9. If the current head is not equal the target head in step 800, then the logic determines if the current cylinder is less than M in step 802. If the current cylinder is not less than M in step 802, then the logic proceeds to B on FIG. 9. If the current cylinder is less than M in step 802, then the logic determines if the target cylinder is greater than or equal to M in step 804. If the target cylinder is greater than or equal to M in step 804, then the logic determines if the target cylinder is less than or equal to N in step 806. If the target cylinder is not greater than or equal to M in step 804, or if the target cylinder is not less than or equal to N in step 806, then the logic signals the system to seek the current head to cylinder M in step 808. If the target cylinder is less than or equal to N in step 806, then the logic signals the system to seek the current head to the target cylinder in step 810. The logic proceeds to C on FIG. 9 after steps 808 and 810.

If the current cylinder is not less than M in step 802 on FIG. 8, then the logic determines if the current cylinder is greater than N in step 902 on FIG. 9. If the current cylinder is greater than N in step 902, then the logic determines if target cylinder is greater than or equal to M in step 904. If the target cylinder is greater than or equal to M in step 904, then the logic determines if the target cylinder is less than or equal to N in step 906. If the target cylinder is not greater than or equal to M in step 904, or if the target cylinder is not less than or equal to N in step 906, then the logic signals the system to seek the current head to cylinder N in step 908. If the target cylinder is less than or equal to N in step 906, then the logic signals the system to seek the current head to the target cylinder in step 910. The logic signals the system to switch from the current head to the target head after steps 808, 810, 908, 910, or if the current cylinder is not greater then N in step 902. After the head switch in step 912, the logic signals the system to seek the target head to the target cylinder if necessary in step 914. If the current head is not equal the target head in step 800 on FIG. 8, then the logic signals the system to seek the target head to the target cylinder in step 914 on FIG. 9.

The logic of FIGS. 7–9 could be implemented with firmware that is executed within a processor. For example, the logic could be executed as firmware in the servo control 106 or the microprocessor 108 of the magnetic disk system 100. The logic could also be implemented in the form of a hardware state machine. For example, the logic could be implemented as a hardware state machine in the servo control 106 or the microprocessor 108 of the magnetic disk system 100. The servo control 106 and the microprocessor 108 are typically integrated circuits. Those skilled in the art recognize how the logic of FIGS. 7–9 could be implemented through firmware or hardware in an integrated circuit.

In FIGS. 7–9, step 700 corresponds to steps 802 and 902. Step 702 corresponds to steps 804, 806, 904, and 906. Step 704 corresponds to steps 808 and 908. Step 710 corresponds to steps 810 and 910. Steps 706 and 708 correspond to steps 912 and 914 respectively. The invention is not restricted to the specific logic of FIGS. 7–9. For example, the steps 902 through 910 could be reversed with steps 802 through 810. In addition, the cylinders could be numbered in reverse order causing the arithmetic operations to be reversed. Since the invention may introduce an extra seek operation, a surface mode format should be used to minimize the number of head switch operations. A surface mode format is a known technique for locating consecutive logical blocks of user data on the same disk surface.

Those skilled in the art can appreciate variations of the above-described embodiments that fall within the scope of the invention. As a result, the invention is not limited to the specific embodiments discussed above, but only by the following claims and their equivalents.

What is claimed is:

1. A method for performing head switch operations in a magnetic disk system that includes a magnetic disk device, wherein the magnetic disk device is segmented into a plurality of cylinders that are grouped into an outer zone, a middle zone, and an inner zone, and wherein a head switch is from a current head at a current cylinder to a target head at a target cylinder, the method comprising:

(a) determining if the current cylinder is in either the inner zone or the outer zone;

(b) if the current cylinder is in either the inner zone or the outer zone in step (a), then determining if the target cylinder is in either the inner zone or the outer zone;

(c) if the current cylinder is not in either the inner zone or the outer zone in step (a), then proceeding to step (f);

(d) if the target cylinder is in either the inner zone or the outer zone in step (b), then seeking the current head to the middle zone and proceeding to step (f);

(e) if the target cylinder is not in either the inner zone or the outer zone in step (b), then seeking the current head to the target cylinder and then proceeding to step (f); and (f) performing the head switch from the current head to the target head.

2. The method of claim 1 wherein step (f) further comprises seeking the target head to the target cylinder after the head switch.

3. An apparatus for facilitating head switch operations in a magnetic disk system that includes a magnetic disk device, wherein the magnetic disk device is segmented into a plurality of cylinders that are grouped into an outer zone, a middle zone, and an inner zone, and wherein a head switch is from a current head at a current cylinder to a target head at a target cylinder, the apparatus comprising:

a logic means for determining if the current cylinder is in either the inner zone or the outer zone, and if the current cylinder is in either the inner zone or the outer zone for determining if the target cylinder is in either the inner zone or the outer zone; and a signal means for signaling the magnetic disk system to perform the head switch from the current head to the target head if the logic means determines that current cylinder is not in either the inner zone or the outer zone, for signaling the magnetic disk system to seek the current head to the middle zone and then perform the head switch from the current head to the target head if the logic means determines that the target cylinder is in either the inner zone or the outer zone, and for signaling the magnetic disk system to seek the current head to the target cylinder and then perform the head switch from the current head to the target head if the logic means determines that the target cylinder is not in either the inner zone or the outer zone.

4. The apparatus of claim 3 wherein the logic means and the signal means are integrated into a servo control integrated circuit.

5. The apparatus of claim 3 wherein the logic means and the signal means are integrated into a microprocessor integrated circuit.

6. The apparatus of claim 3 wherein the logic means and the signal means comprise firmware that is stored in an integrated circuit.

7. The apparatus of claim 3 wherein the logic means and the signal means comprise a hardware state machine that is integrated into an integrated circuit.

8. The apparatus of claim 3 further comprising a pre-amp that is operational to perform the head switch from the current head to the target head responsive to the signaling from the signal means.

9. The apparatus of claim 8 further comprising a servo control integrated circuit and an actuator that are operational to seek the current head to the middle zone or to seek the current head to the target cylinder responsive to the signaling from the signal means.

10. The apparatus of claim 9 further comprising a read channel integrated circuit that is operational to receive a read signal from the pre-amp, to process the read signal, and to provide the processed read signal to the servo control integrated circuit.

* * * * *